United States Patent [19]

Ringle

[11] 4,279,523
[45] Jul. 21, 1981

[54] POWER RECOVERY APPARATUS FOR AN ELECTRIC TYPEWRITER

[75] Inventor: Terry W. Ringle, Lexington, Ky.

[73] Assignee: International Business Machines Corporation, Armonk, N.Y.

[21] Appl. No.: 75,391

[22] Filed: Sep. 14, 1979

[51] Int. Cl.³ ............................................. B41J 19/00
[52] U.S. Cl. ..................................... 400/279; 400/54; 400/70; 400/320; 400/322; 400/328; 364/900
[58] Field of Search ........................ 400/50, 52, 54, 61, 400/62, 70, 76, 279, 320, 322, 328; 364/900 MS File

[56] References Cited

U.S. PATENT DOCUMENTS

| | | | |
|---|---|---|---|
| 3,233,715 | 2/1966 | Flieg | 400/62 |
| 3,554,347 | 1/1971 | Perkins | 400/320 |
| 4,051,945 | 10/1977 | Fujimoto et al. | 400/279 |
| 4,067,430 | 1/1978 | Wienhold | 400/279 X |

Primary Examiner—Ernest T. Wright, Jr.
Attorney, Agent, or Firm—Pollock, Vande Sande & Priddy

[57] ABSTRACT

An electric typewriter includes a RAM memory for storing selected characters to be printed and for storing data relating to the present escapement position and future escapement destination of a printing head of the typewriter. A control unit operates a printer to print the stored characters in the memory unit and, when a power interrupt occurs and power is subsequently restored, the control unit accesses particular position data in the memory in accordance with the angular position of a print shaft of the typewriter at the time of the power interrupt. The accessed data is employed to define a proper return escapement position for the printing head of the typewriter.

8 Claims, 6 Drawing Figures

POWER RECOVERY APPARATUS FOR AN ELECTRIC TYPEWRITER

DESCRIPTION

1. Technical Field

The invention relates to an apparatus for returning the printing head of a typewriter to a restart escapement position after an interruption in the main power supply of the typewriter and, more particularly, to such an apparatus wherein a character is reprinted after a power interrupt if the power interrupt occurs before an inertial print point in the printing cycle of the character.

2. Background Art

Electric typewriters that store and print selected characters are known to the art. Such electric typewriters typically have an electrically powered memory that stores coded representations of selected characters and a control apparatus, for example a microprocessor, that causes the character to be sequentially read from the memory and printed by a suitable printing apparatus.

It is known that if power is lost while the printer of a typewriter is engaged in a printing operation, and power is subsequently restored, the operational condition of the printer may be ambiguous, since power may have been removed before a character was properly printed or before a proper escapement of the printing head was carried out. It has been suggested in the U.S. patent to Perkins, U.S. Pat. No. 3,554,347, that after a power down condition, the printing head of a typewriter may be returned to a particular reference position, for example a far margin of the typewriter. However, the apparatus of the Perkins patent is not employed to automatically return the printing head of a typewriter to a correct escapement position when power is restored after a power interrupt.

It has also been disclosed in the prior art, for example in the U.S. Patent to Flieg, U.S. Pat. No. 3,233,715, that the angular position of a print shaft may be employed to provide a timing sequence for the normal mechanical operations of a typewriter. However, it has not been suggested in the prior art that the feedback angle of such a print shaft may be used to determine the proper escapement position of a print head when power is restored after a power interrupt.

Accordingly, it is an object of the invention to provide an apparatus and system for returning the print head of an electric typewriter to a proper return print position when power is restored after a power interrupt.

Another object of the invention is to provide such an apparatus, wherein the feedback angle of a print shaft of a typewriter is employed to define a particular point in time during a print cycle at which the printing apparatus will complete a printing operation even if power is removed, the point in time then being used to determine if a character should be required when power is returned.

A further object of the invention is to provide an apparatus including print status registers that store the identity and escapement positions of selected characters and that define the angular position of a print shaft at the time of a power interrupt.

These and other objects of this invention will become apparent from a review of the detailed specification which follows and a consideration of the accompanying drawing.

DISCLOSURE OF THE INVENTION

In order to achieve the objects of the invention and to overcome the problems of the prior art, the apparatus for recovering from an interruption of power to a printer, according to the invention, includes memory means for storing the character identity and position codes of selected characters. A print shaft is provided to define a print cycle for each character. The cycle has print operations including an initiation operation, a completion operation and an intermediate operation that defines a point in time after which a character will be satisfactory printed even if power to the printer is lost. A status latch is provided to indicate when the intermediate operation of a cycle has been executed.

A control means accesses particular character identity and position codes in the memory means in accordance with the condition of the status latch and the angular position of the print shaft, and defines a return escapement position when power is restored after a power interrupt. A displacement means moves the print head of the printer to the return escapement position and normal printing is then resumed.

BEST MODE FOR CARRYING OUT THE INVENTION

Figures 1A, 1B:
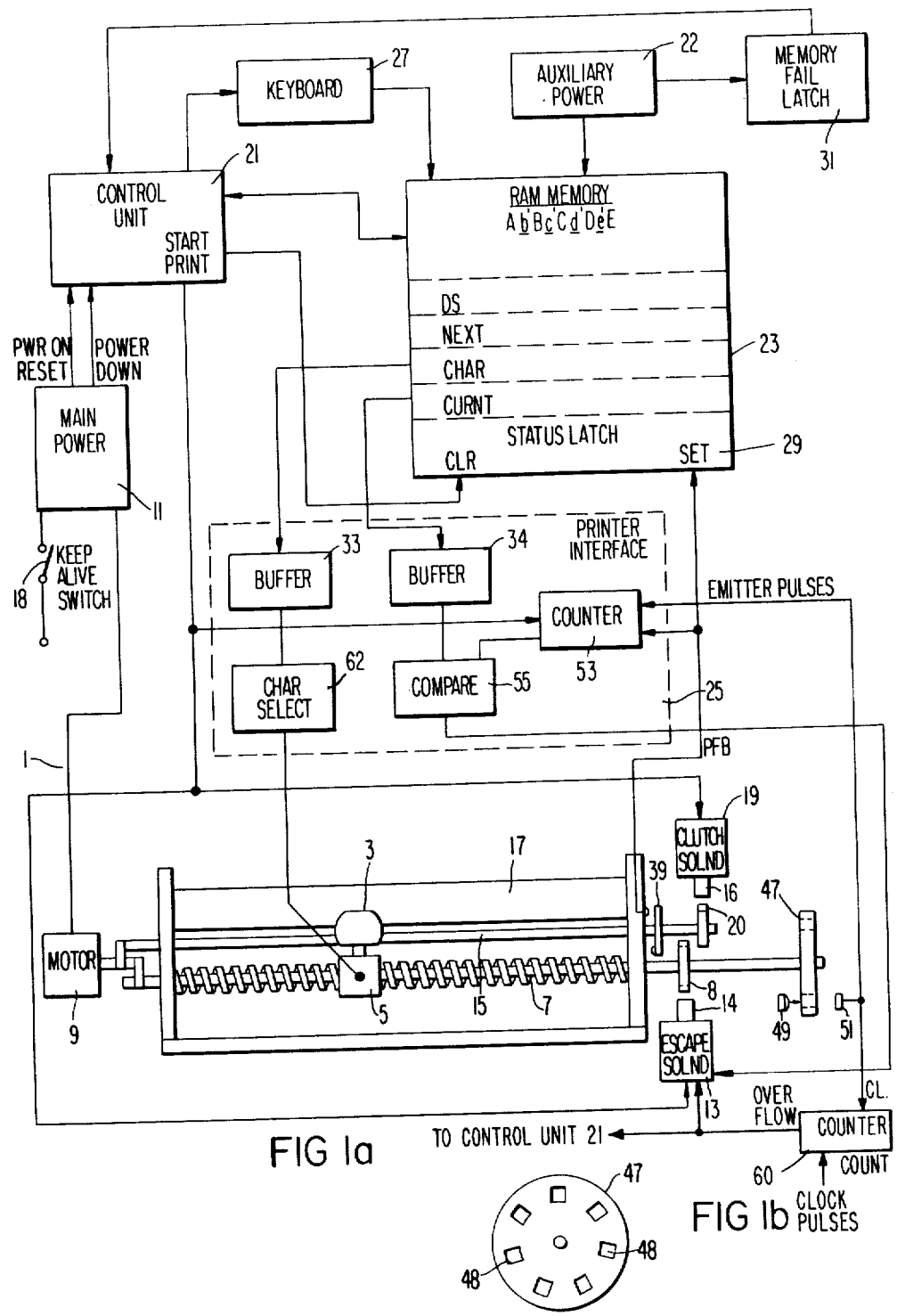
FIG. 1*a* is a diagrammatic illustration of a printer and printer control apparatus in accordance with the invention.
FIG. 1*b* is a front elevation view of a timer disk for the apparatus of FIG. 1*a*.

The remaining portion of this specification will describe preferred embodiments of the invention when read in conjunction with the attached drawing, in which like reference characters identify identical apparatus.

FIG. 1*a* shows a diagrammatic view of a printer and associated control devices in accordance with the invention. In operation, a printing unit 1 is employed to receive selected character codes and to print corresponding lines of characters. For a preferred embodiment of the invention, the printing unit 1 may be an IBM 50 or 60 electric typewriter, although it should be understood that other typewriters may be employed without departing from the spirit of the invention.

The printing unit 1 of FIG. 1 includes a spherical printing element or head 3 that is supported on a carrier 5 and that is moved transversely by means of a leadscrew 7 that rotates to move the carrier 5 through successive printing positions along a line. The leadscrew 7 is rotated by a motor 9 that is powered by a main power supply 11. The leadscrew 7 rotates under the control of an escapement solenoid 13. An extending arm 14 of the solenoid 13 engages a ratchet 8 and thereby blocks the rotational movement of the leadscrew 7 when the solenoid 13 is de-energized and disengages the ratchet 8 to allow the leadscrew 7 to rotate when the solenoid 13 is energized.

The motor 9 is also employed to rotate a print shaft 15 that is employed to drive the printing head 3 into contact with a platen 17 that supports a paper. A selected character is printed on the paper when the printing head 3 impacts the paper. The print shaft 15 rotates under the control of a cycle clutch solenoid 19 that may be de-energized to engage a clutch latch 16 with a sleeve 20 of the print shaft 15 and to thereby hold the shaft 15 at a 0° reference position. Energization of the clutch solenoid 19 causes the clutch latch 16 to disengage from the sleeve 20 of the print shaft 15, thereby allowing the shaft 15 to rotate from the 0° reference position through a 360° print cycle. The print shaft 15 will continue to rotate to define successive print cycles for the printing head 3 if the clutch solenoid 19 is energized to avoid engaging the latch 16 and the sleeve 20 at the 0° reference position.

The printing head 3 strikes the platen 17 only once during a particular 360° printing cycle. For the embodiment of FIG. 1a, when the print shaft 15 moves to an 85° point in the print cycle, the shaft 15 and associated printing apparatus acquires a momentum that is sufficient to print a character, even if the printer loses main power immediately after the printing shaft 15 reaches the 85° point. Thus, the 85° cycle position of the print shaft 15 defines a point at which the printer will carry through a satisfactory print operation by inertia.

It should be understood that although the invention is described with respect to a printer which has an 85° inertial print point, other printers with different inertial print points may be employed without departing from the spirit of the invention. In addition, such a print point may be defined with respect to operations other than mechanical operations and conditions other than inertial conditions. For example, for a thermal printer the print point may be defined as the point at which the thermal elements of the printer are sufficiently heated to cause a printed character to appear on thermal paper even though power is simultaneously or subsequently dropped from the printer.

It should also be understood that in printing a character, a printer interface 25 sends a coded signal corresponding to the identity of the selected character to the printing unit 1 and the signal is utilized in a manner known to the art to position a corresponding character on the printing head 3 to strike the platen 17 at a particular time after the inertial print point of 85° is reached. Of course, prior to the printing of a particular character, the lead screw 7 is rotated to move the carrier 5 and associated printing head 3 to a particular position at which the selected character is to be printed.

The printing unit 1 and printer interface 25 of FIG. 1a are controlled by a control unit 21, for example a microprocessor, and an associated RAM memory 23. More particularly, in operation, characters are successively selected on a keyboard 27 and coded representations of the characters are stored in the RAM memory 23 by the control unit 21. If the typewriter is a proportional spacing typewriter, the spacing between adjacent characters may also be stored in the RAM memory 23.

In accordance with the invention, various memory registers or locations in the RAM memory 23 are employed to store character position information and character identification information so that the characters that are entered on the keyboard 27 may be properly printed by the printing unit 1. The registers or memory locations are also utilized by the control unit 21 to return the printing unit 1 to a proper operational condition following a loss of main power from the power supply 11 during a printing operation.

When the main power of the power supply 11 is turned off during a printing operation, either due to a power malfunction or due to the closing of a "keep alive" switch 18, operational power is supplied to the memory 23 (including a status latch 29) by an auxiliary power supply 22, for example batteries. Also, the main power supply 11 applies a "power down" signal to the control unit 21 to notify the control unit 21 that a power loss has occurred. Thereafter, the control unit 21 stores data in the RAM memory 23 and the status latch 29 to define a proper operational state for the printing unit 1 when power is returned.

It should be appreciated that if main power is lost during a printing cycle, a character may or may not have been printed with sufficient force to produce a discernible imprint on the paper. Also, if the printing head 3 was being moved to a particular character position when the power loss occurred, the printing head 3 may be stopped in an intermediate position. Accordingly, when main power is returned it is necessary to return the printing head 3 to the character position following the last discernible character that was printed immediately prior to the power interruption.

When the main power from the main power supply 11 is returned due to a correction of the power defect or to the opening of the keep alive switch 18, the main power supply 11 sends a power on reset signal to the control unit 21, thereby notifying the control unit 21 that main power has returned. Thereafter, the control unit 21 accesses the RAM memory 23 and status latch 29 and defines an appropriate return printing position for the printing head 3 of the printing unit 1. The printing head 3 is then moved to the computed return position and printing is resumed.

Thus, when power is returned, the control unit 21 evaluates the activity of the printing head 3 immediately prior to the loss of main power, and, if the head 3 was in the act of printing a particular character, it is determined whether the character was printed after power was removed. If the character was printed, the printing head 3 is positioned at a next successive printing position to begin printing the character following the previously printed character. However, if the interruption of main power was sufficiently early in a printing cycle to prevent the proper printing of a particular character, the control unit 21 returns the printing head 3 to the position of the character and prints the character when power returns, and then prints additional characters in accordance with the normal operation of the printing unit 1.

A memory fail latch 31 is provided to indicate if auxiliary power to the RAM memory 23 is lost while the printing unit 1 is de-energized. If the memory fail latch 31 indicates that auxiliary power was interrupted, the control unit 21 will not access the RAM memory 23 to obtain position status data when main power is returned, since the loss of auxiliary power to the memory 23 will cause the data in the memory 23 to be destroyed. Accordingly, in the event that auxiliary power is lost while main power is interrupted, the control unit 21 will return the printing head 3 to a particular starting position when power is returned, for example the printing head 3 may be returned to the far left margin of the printer.

The operation of the apparatus of FIG. 1a in response to a power down condition will be better understood with reference to a particular example wherein the characters A, B, C, D and E are entered on the keyboard 27 and the characters and associated spacings b', c', d' and e' are stored in the RAM memory 23. More particularly, the following character sequence is stored in the RAM memory 23:

A b' B c' C d' D e' E

As the above characters are typed on the keyboard 27, the control unit 21 operates to store the characters in the RAM memory 23 and to sequentially apply the characters to the printing unit 1 through the printer interface 25. The control unit 21 operates the cycle clutch solenoid 19 and escape solenoid 13 to cause the printing head 3 to print the stored characters.

Figure 2:
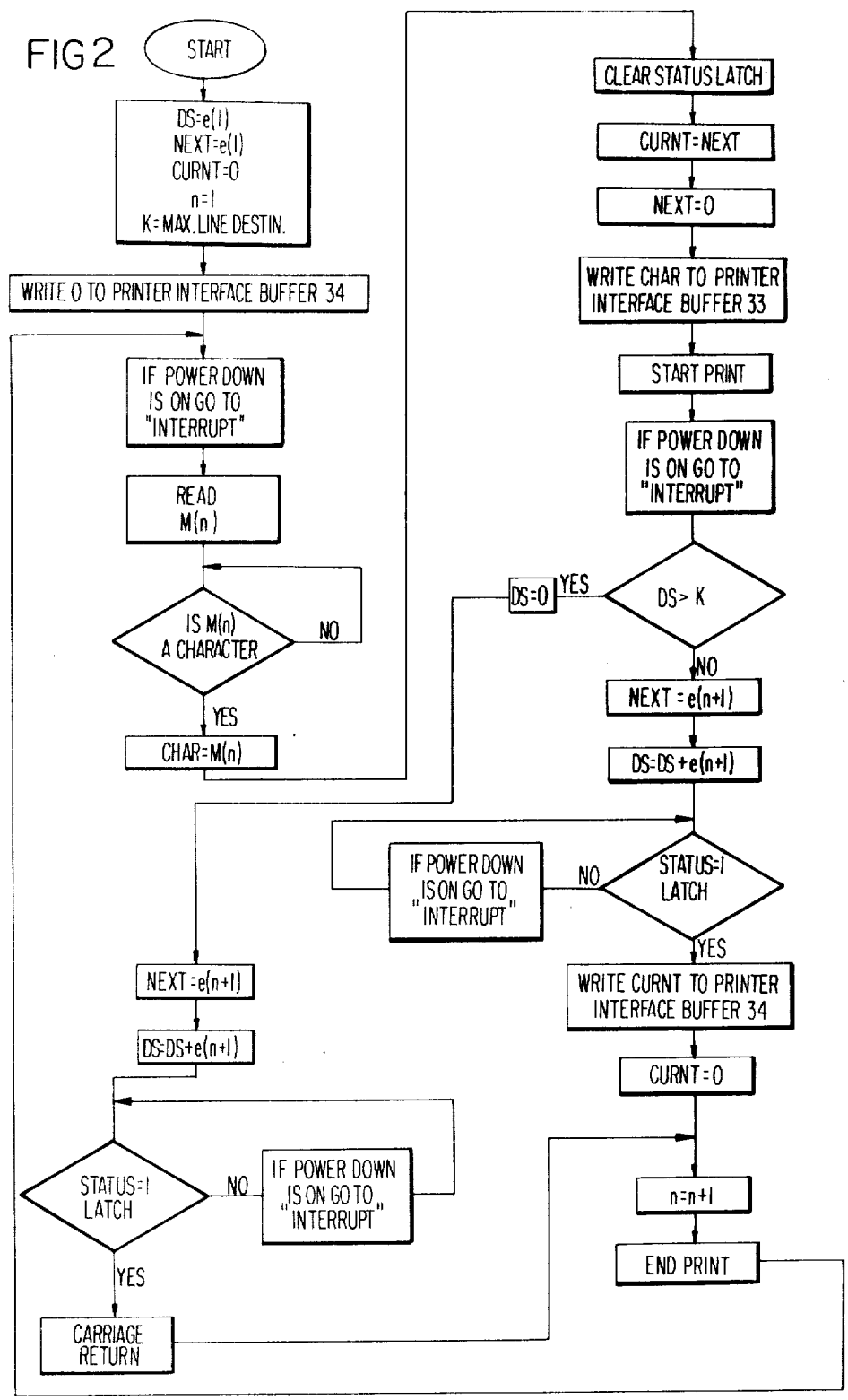
FIG. 2 illustrates a flow chart of program steps for operating the printing apparatus of FIG. 1*a* to print selected characters and for detecting the occurrence of a power interrupt.

FIG. 2 illustrates a flow chart of a program that may be used by the control unit 21 to control the operation of the printing unit 1. The program steps of FIG. 2 will be explained with respect to registers or memory locations of the RAM memory 23 designated CURNT, CHAR, D and NEXT. Of course, the designations correspond to particular addresses in the RAM memory 23.

Figure 3:
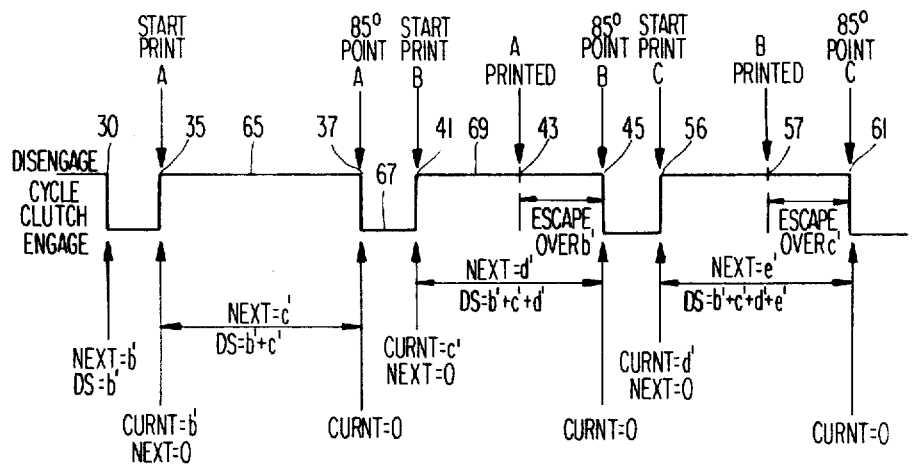
FIG. 3 is a timing diagram of the control signal for the cycle clutch of the print shaft of the apparatus of FIG. 1*a*.

The operation of the embodiment of FIG. 1a will also be described with respect to the timing diagram of FIG. 3 wherein a control signal for the clutch solenoid 19 of the print shaft 15 is shown. It should be understood that the high portion of the signal of FIG. 3 corresponds to an energization condition of the clutch solenoid 19 and a corresponding disengagement of a clutch latch 16 from a sleeve 20 of the print shaft 15. The low portion of the signal of FIG. 3 corresponds to a de-energization condition of the clutch solenoid 19 and a corresponding extension of the clutch latch 16 of the clutch solenoid 19 to engage a corresponding sleeve 20 of the print shaft 15 at the 0° reference position of the print shaft 15.

It should be understood that in the flow charted program of FIG. 2, it is assumed that the entered characters A, B, C, D and E are stored at memory positions in the RAM memory 23 corresponding to M(1), M(2), M(3), M(4) and M(5). The space b' between the characters A and B is stored at a memory location designated e(1) and, likewise, the successive character spacings c', d' and e' are respectively stored at memory locations designated e(2), e(3) and e(4).

In executing the program of FIG. 2, the initial conditions for the program are set by defining the contents of the destination register D and the register NEXT as e(1) or, in the case of the present example, as b'. In addition, the register CURNT is cleared to 0, a counter n is set equal to 1, a line parameter k is set to the maximum possible line escapement destination for the printing unit 1 and a value of zero is written to a printer interface buffer 34.

It should be understood that the printing head 3 moves to print characters at positions on a line between a far left margin and a far right margin of the printing unit 1. Accordingly, for purposes of discussion, the printing position at the far left margin of the printing unit 1 is given the numerical designation 0 and each successive character position is assigned a number increased by one over the number of the previous character position. The numerical designation of the character position at the far right margin of the printing unit 1 is, of course, the maximum line escapement destination.

In general, the D register stores a numerical amount corresponding to a particular line destination for the printing head 3 and the NEXT and CURNT registers may store numerical amounts corresponding to particular incremental distances to be moved by the printing head 3 between successive character positions.

As shown in FIG. 2, the contents of the memory location M(1) is initially read and, since the stored coded representation at the location M(1) corresponds to the first selected character, the character "A" is stored in the CHAR register. Thereafter, the status latch 29 is cleared so that the latch 29 contains a 0 and the contents of the register NEXT is stored in the CURNT register. Thereafter, the NEXT register is set to zero and the contents of the CHAR register is written to the printer interface 25, where it is stored in a buffer 33. A start-print command is then sent from the control unit 21 to the printer interface 25 and the printer unit 1. As shown in FIG. 3, the start print command from the control unit 21 energizes the cycle clutch solenoid 13, thereby allowing the print shaft 15 to begin rotating to print the character A that is stored in the CHAR register and buffer 33. The point in time at which the above start print command is generated is designated 35 in FIG. 3.

After the start print command is generated, the program of FIG. 2 may compare the destination value b' in the destination register D with the maximum line destination k and, if b' is equal to or less than k, the escapement value c' at e(2) is stored in NEXT and is also added to the contents of the destination register D. While the control unit 21 is executing the above-mentioned program steps, the print shaft 15 is continuing to rotate from the 0° position at the start point 35 to an 85° position at a subsequent point in time designated 37. Thus, it should be understood that the escapement value c' is placed in the register NEXT and is added to the destination register D at some point in time between the start point 35 and the 85° and 37.

As explained previously, at the 85° angular position of the print shaft 15, the momentum of the print mechanism is sufficient to complete the printing of the character A, even if there is an interruption in the main power supply 11.

Figure 4:
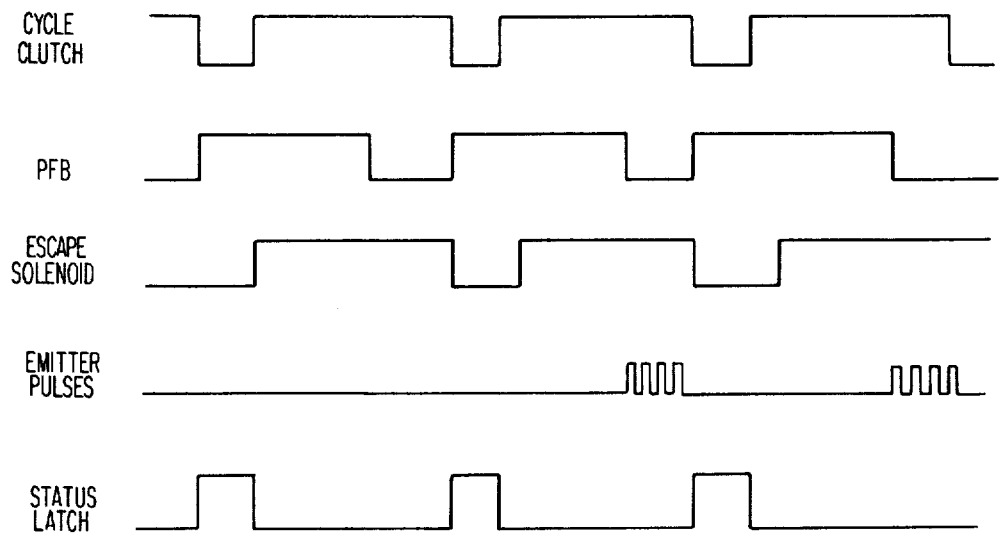
FIG. 4 illustrates the cycle clutch control signal of FIG. 3 and additional control signals for the apparatus of FIG. 1*a*.

As shown in FIG. 1a, the print shaft 15 carries a feedback switch 39 that opens and closes its switch contacts in accordance with the angular position of the print shaft 15. As shown in FIG. 4, the feedback switch 39 generates a print feedback signal PFB that rises when the print shaft 15 is at its 85° position and that falls when the print shaft 15 is at its 300° angular position. The PFB signal is applied to the set input of the status latch 29 so that the rising edge of PFB sets the status latch 29 to a high or 1 state. Thus, at the time designated 37 in FIG. 3, the print shaft 15 is at its 85° angular position and the PFB signal is applied to set the status latch 29.

Accordingly, after writing e(2) or c' in the register NEXT and incrementing the destination register D by c', the program of FIG. 2 continuously reads the state of the status latch 29 until the latch 29 is set to a high or 1 state at the time 37. When the status latch 29 is set, the numerical escapement increment b' in the CURNT register is written into the buffer 34 of the printer interface 25. Thereafter, the CURNT register is cleared to 0, the counter n is incremented by 1 and the program moves back to read the next memory location M(2), which contains the character "B".

Prior to reading the character B, the control program of FIG. 2 executes an end print to turn off the start print signal. Accordingly, the clutch solenoid 19 is de-energized and the clutch latch 16 is extended. However, the print shaft 15 continues to rotate since the extended latch 16 of the clutch solenoid 19 will not engage the sleeve 20 of the print shaft 15 until the print shaft 15 reaches the 360° position at the end of the print cycle.

After the B character is read, the character is stored in the CHAR register, the status latch 29 is cleared, the value of c' in the register NEXT is written to the buffer 33 of the printer interface 25 and the start print signal is again generated by the control unit 21 to energize the clutch solenoid 19 at a start point 41. It should be appreciated that the print shaft 15 will continue to rotate since the clutch solenoid 19 is energized to release the clutch latch 16 prior to the 360° end of cycle for the previously printed character.

The program of FIG. 2 will be executed in the above-described manner to write the contents of e(3) or d' into the register NEXT and to increment the destination register D by d' at some point in time between the second start point 41 and the 85° print point 45 for the B character.

As has been indicated previously, at the 85° print point 37, the momentum of the print shaft 15 and associated print apparatus is sufficient to print the selected character A. Following the print point 37, the printing head 3 moves to contact a paper that is supported on the platen 17 and the printing head 3 impacts the paper at a designated print impact point 43, at which point the character A is printed on the paper.

When the incremental escapement b' is written to the escapement buffer 34, the unequal compare of buffer 34 and counter 53 causes a pick signal to be applied to escapement solenoid 13 that controls the movement of the leadscrew 7. Accordingly, as shown in FIG. 4, the compare 55 output is used to energize the escapement solenoid 13 and to thereby allow the leadscrew 7 to begin moving after the print impact point 43. As the leadscrew 7 rotates, an attached timer disk 47 also rotates.

As shown in FIG. 1b, the timer disk 47 has slots 48 arranged about its periphery. A light source, for example a light emitting diode (LED) 49, is disposed on one side of the timer disk 47 and a photodetector, for example a phototransistor 51, is disposed on the other side of the timer disk 47, opposite the LED 49. As the disk 47 rotates, the slots 48 pass between the LED 49 and phototransistor 51 and intermittently establish an optical path between the LED 49 and phototransistor 51. Thus, the phototransistor 51 generates emitter pulses that correspond to the rotation of the leadscrew 7. The emitter pulses are applied to the input of counter 53 of the printer interface 25, the counter 53 having been previously cleared by the leading edge of the PFB signal. As indicated above, the buffer 34 of the printer interface 25 contains an incremental escapement value b' that was written to the buffer 33 at the time period 37.

As the leadscrew 7 rotates, the emitter pulses are applied to increment the contents of the counter 53 so that the output of the counter 53 corresponds to the incremental escapement movement of the printing head 3 in response to the rotation of the leadscrew 7. The contents of the buffer 34 and the count state of the counter 53 are compared by the comparator 55 and, when the contents b' of the buffer 34 matches the incremented contents of the counter 53, the comparator 55 generates a signal that de-energizes the escapement solenoid 13 and thereby causes the solenoid 13 to engage the ratchet 8 and to stop the rotation of the leadscrew 7. Thus, the leadscrew 7 begins to rotate at the print impact point 43 and continues to rotate to displace the printing head 3 a distance corresponding to the escapement value b' that is stored in the buffer 34. Of course, the escapement movement of the printing head 3 will be completed by the time period 45 at which the print shaft 15 is at its 85° angular position.

As shown in FIG. 3, the character B will be printed on the paper at a print point 57 and the program of FIG. 2 will execute a start print for the character "C" at a start point 56. Of course, the escapement solenoid 13 and the leadscrew 7 will be operated to move the printing head 3 an escapement distance c' during the time period between the print point 57 and a subsequent point 61 at which the print shaft 15 reaches an 85° angular position in its print cycle for the character C.

It should be understood that the printing head 3 was not moved between the times 35 and 37 of the A print cycle, since a zero escapement value was written to the buffer 34 in setting up the initial conditions for the program of FIG. 2.

As has been indicated above, the identity of the character to be printed is stored in the CHAR register of the RAM memory 23. The contents of the CHAR register is written to a character store buffer 33 of the printer interface 25 at the time that the character is stored in the CHAR register, for example at the time 35 for the character A and at the time 41 for the character B. The coded word in the buffer store 33 may then be applied to character select logic 62 that operates in a manner known to the art to select the particular corresponding character on the printing head 3, so that the selected character will impact the paper on the platen 17 at an impact point, for example 45 or 47.

Referring to FIG. 2, it can be seen that after the start print command, the escapement value in the destination register D is compared to the maximum line destination parameter k. If the contents of register D is greater than the parameter k, the destination register D is cleared, the usual escapement displacement value is inserted in the register NEXT and is added to the cleared D register and the status latch 29 is continuously checked until the latch 29 is set. However, after the status latch 29 is set, the carrier 5 is returned, the counter n is incremented, the end print signal is generated and the program is returned to its start point to begin printing characters from the beginning of a line in the manner described above.

For the sake of simplicity, the flow chart of FIG. 2 has been explained with respect to an incrementing counter n that is incremented for as long as the apparatus of the invention continues to receive characters from the keyboard 27 and to print the characters on the printing unit 1. However, it should be appreciated that the RAM memory 23 has a finite capacity and, of course, once a character has been printed, the corresponding character code may be erased from the memory 23. Thus, a more complex memory access scheme may be employed to access current data from the RAM memory 23. However, the simple counter n of the flow chart of FIG. 2 has been employed to illustrate an easily understood method for sequentially selecting data from the RAM memory 23. It should be appreciated that other known access schemes may be employed to access the RAM memory 23, without departing from the spirit of the invention.

As has been pointed out previously, the status latch 29 is set by the leading edge of the PFB signal of the print shaft 15 and is cleared by the control unit 21 when the control unit 21 begins a print cycle for a particular character. The output of the control latch 29 is illustrated in FIG. 4 to show the relationship between the operational condition of the latch 29 and the other control signals of the apparatus of the invention.

Figure 5:
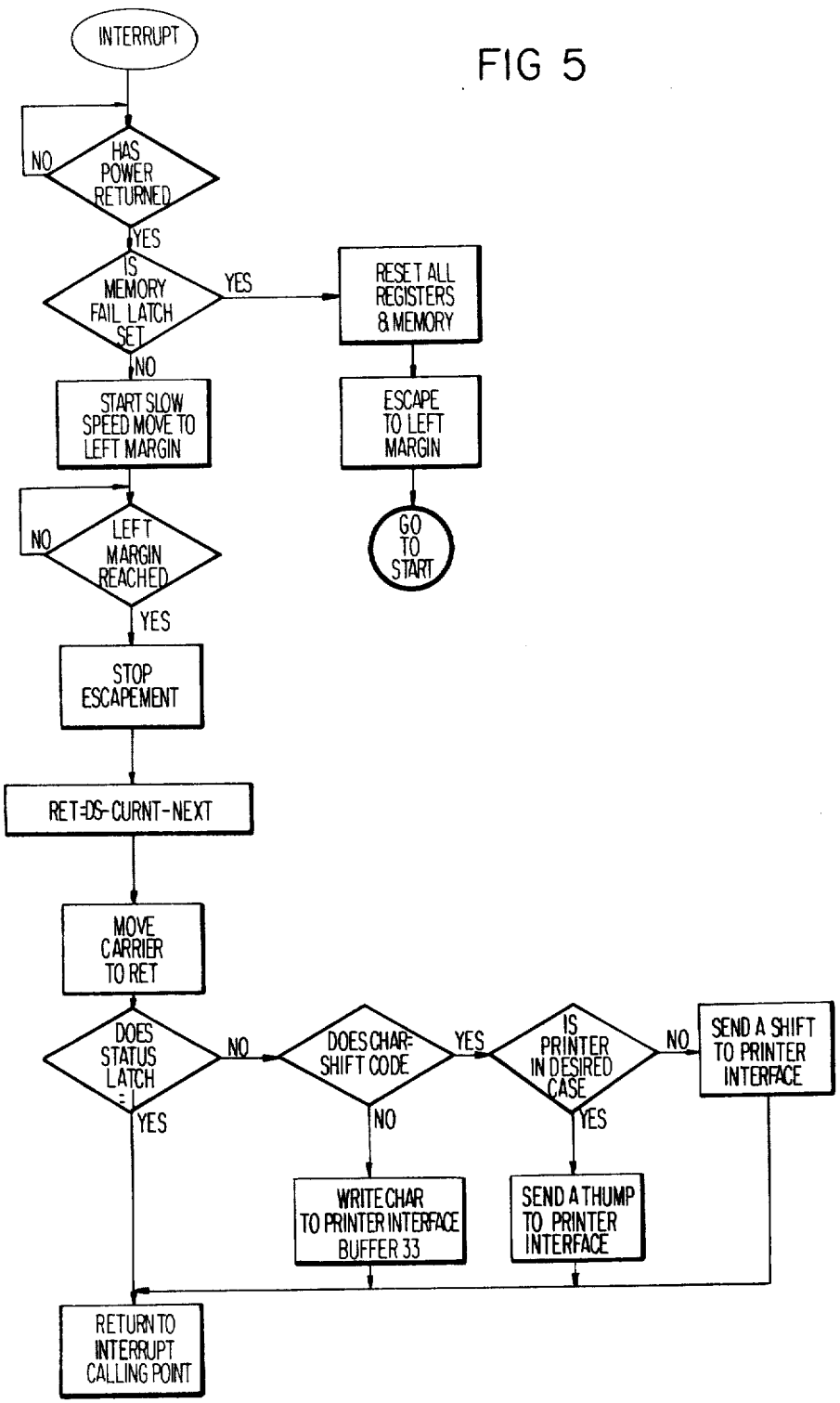
FIG. 5 illustrates a flow chart of program steps for a printer restart procedure in accordance with the invention.

FIG. 5 illustrates a flow chart of a power interrupt program that is accessed by the control unit 21 when main power is lost. As indicated above, the main power supply 11 generates a power down signal to the control unit 21 when main power is lost and, as shown in FIG. 2, the control unit 21 checks for the power down signal at several points in the flow chart of FIG. 2. In accordance with the invention, the power down signal of the main power supply 11 does not interrupt the control unit 21 during times when the control unit 21 is writing data to the registers of the RAM memory 23 or the status register 29. However, the condition of the power down signal would be monitored immediately after the start print signal is generated and the corresponding RAM memory registers and status latch 29 have been written. Likewise, the condition of the power down signal would be monitored while the control unit 21 is continually monitoring the condition of the status latch 29 after the start print signal has been generated. The condition of the power down signal would also be monitored just prior to the reading of a new character from the RAM memory 23.

If the power down signal is detected at the indicated points of the flow chart of FIG. 2, the check point at which the failure is detected is saved in RAM memory 23 to be used when resuming normal printer operation after the recovery sequence is complate, and program control is transferred to the interrupt routine of FIG. 5, wherein the control unit 21 continuously monitors the condition of the power down signal until power to the control unit 21 is dropped or the power down signal switches to an inactive level. When main power is returned to the printing unit 1, the condition of the memory fail latch 31 is first checked to determine if the latch 31 is set. As explained previously, the memory fail latch 31 will be set if the RAM memory 23 loses power at any time during the interruption of printer power. If the memory fail latch 31 is set, the control unit 21 will act to reset all memory units and to move the printing head 3 to the left margin. Thereafter, control will be returned to the print control program of FIG. 2 so that new characters may be entered from the keyboard 27.

If power is returned and the memory fail latch 31 indicates that power was maintained to the RAM memory 23 during the power down condition, the escapement solenoid 13 will be operated to allow the leadscrew 7 to rotate and to slowly move the carrier 5 and supported printing head 3 towards the left margin of the printing unit 1. As the carrier 5 moves toward the left margin, the timer disk 47 and associated optical apparatus will generate a continuous stream of emitter pulses. When the carrier 5 and supported printing head 3 reach the left margin, the leadscrew 7 will stop rotating and, therefore, emitter pulses will no longer be generated. The absence of emitter pulses indicates that the carrier 5 has reached the left margin.

The state of the continuous stream of emitter pulses may be monitored by applying the pulses to clear a counter 60 that is being simultaneously incremented by input clock pulses. Since the emitter pulses are continuously applied to clear the counter 60, the contents of the counter 60 will not be incremented to a particular overflow count state until the emitter pulses cease. Thus, when the emitter pulses are no longer generated, the counter 60 is quickly incremented to an overflow count state that may be applied to indicate that the emitter pulses have stopped and that, therefore, the carrier 5 has reached the left margin. It should be understood that other means may be employed to register a return to the left margin without departing from the spirit of the invention.

After the printing head 3 is returned to the left margin, the leftward escapement of the carrier 5 is stopped and a return escapement destination RET is computed by subtracting the contents of the CURNT register and the NEXT register from the contents of the destination register D.

It should be understood that if the power down interrupt occurs at the designated point 65 of FIG. 3, the contents of the destination register D and the CURNT register will be b' and the contents of the register NEXT will be 0. Thus, the return escapement destination RET will be equal to 0. Therefore, when power is returned, the carrier 5 will be returned to the left margin and the contents of the CHAR register "A" will be printed at the 0 position. It should be understood that the A was not previously printed since the power interrupt occurred prior to the 85° print point 37 of FIG. 3.

If the power down interrupt occurs at the point designated 67 of FIG. 3, the destination register D will have been incremented to b'+c', the register NEXT will contain c' and the CURNT register will have been set to 0. Thus, the return destination RET will be equal to b'. Accordingly, when power is returned, the carrier 5 will be moved to the left margin and, thereafter, the carrier 5 will be moved forward an escapement distance b' to the B character position. The printing head 3 is returned to the B character position in this case because the power interrupt occurred after the shaft 15 reached the 85° print point 37 and, therefore, even though a power interrupt occurred at point 67, the character A was printed.

If the power interrupt occurs at the time designated 69 in FIG. 3, the desitination register D may contain an escapement value of b'+c', the register NEXT may contain 0 and the CURNT register will contain c'. Accordingly, the return destination will be computed as: RET=(b'+c')−c'−0=b'. Thus, after power is returned, the carrier 5 is returned to the left margin and the carrier 5 is then moved forward to the B position over a distance b'. Likewise, if at the point 69 the destination register D contains b'+c'+d', NEXT contains d' and CURNT contains 0, then the return destination will be computed as follows: RET=(b'+c'+d')−c'−d'=b'. Thus, even though the respective values of the D and NEXT registers have changed, the computation of RET will be the same and, therefore, the carrier 5 will be moved to the B position after power is returned.

In general, it should be understood that if a power down interrupt occurs between an initial designated position 30 and the position designated 37, the carrier 5 will be returned to the A position to print the A character when power is returned. If a power interrupt occurs between the designated times 37 and 45, the carrier 5 will be returned to the B position to print the character B. Likewise, if a power interrupt occurs between the designated points 45 and 61, the carrier 5 will be returned to the C position and, thereafter, the character C will be printed.

After power has returned and the carrier 5 is returned to the computed return destination, the status latch 29 is checked to determine if the latch 29 is in the set or 1 state. If the status latch 29 is set at 1, the program control is passed from the restart procedure of FIG. 5 to the calling point of the program of FIG. 2. However, if the status latch 29 is not set and if CHAR does not contain a shift code, the code in CHAR must be written to the printer interface buffer 33 before program control is returned to the calling program, since the power down condition destroyed the contents of the buffer 33.

If CHAR contains a shift character, the control unit 21 determines if the printer is operated in the desired case. If the printer is in the desired case, a THUMP is issued to the printer interface 25 and program control is returned to the program of FIG. 2. However, if the printer interface 25 is not in the desired case, a shift is sent to the printer interface 25 and program control is returned to the program of FIG. 2. The apparatus for providing a shift of the printer is not shown in FIG. 1a since such apparatus is well known to the art.

As explained above, the embodiment of FIG. 1a utilizes the contents of the status latch 29 to determine whether a power interrupt occurs before or after the 85° print point in a print cycle and thereby determines whether or not to reprint the character of the interrupted cycle. However, in accordance with the invention, a less complex power interrupt return program may be provided wherein the carrier 5 is always returned to the position of the character that was to be printed during the interrupted printing cycle. For such a system, the contents of the various registers would be adjusted to provide a return to a particular character position if a power interrupt occurs at any time between the starting and ending of the printing cycle of the character. Thus, for such a modified system, the character A would be reprinted if a power interrupt occurs at any time between the designated times 35 and 41 of FIG. 3.

The previously described, less complex power interrupt always reprints the last character; another option is never reprinting the last character. In this system, characters may be imperfectly printed; however, the escapement is still corrected so that all characters after a power disturbance are printed in the proper positions relative to the characters printed prior to a power failure. The operator can manually retype an unacceptable character. For this system, the escapement return computation is modified to be RET=D−NEXT. If a power failure occurs anytime within a character's print cycle, the character is assumed to be printed correctly and the carrier 5 is returned to that character's print position plus its incremental escapement. For example, if the disturbance occurs anytime between 35 and 41, the carrier 5 will be returned to "A" print plus b'.

The invention may be embodied in other specific forms without departing from its spirit or other essential characteristics. The present embodiments are, therefore, to be considered in all respects as illustrative and not restrictive, the scope of the invention being indicated by the claims rather than by the foregoing description and all changes which come within the meaning and range of the equivalents of the claims are therefore intended to be embraced therein.

I claim:

1. Power recovery apparatus for returning the printing element of a printer to a defined position on a print line when power is returned to the printer following a loss of power to the printer during a printing operation, comprising:

displacement means for moving said printing element along said print line;

memory means for storing character identity codes representative of selected characters and address amounts representative of positions of the characters on a print line;

means for defining a print cycle for each character, the cycle having a sequence of print operations for printing the character, said sequence of operations including an initiation operation for starting the print cycle, a completion operation for printing the character and an intermediate operation defining a point in time after which the character will be satisfactorily printed even if power to the printer is lost; and control means for operating said memory means to store particular character codes and address amounts representative of said print operations, said control means responsive to a loss and a subsequent return of printer power for accessing at least the particular character codes and address amounts stored in said memory means at the time of the power loss and operating said displacement means to return said printing element to the print line position of the character following the last character that was printed before said power loss occurred.

2. The apparatus of claim 1 wherein said means for defining includes a status memory means for operating in a first state in response to said initiation operation and operating in a second state in response to said intermediate operation, the operational state of the status memory means at the time of the loss of power defining the last character that was printed before the power loss occurred and determining the value of at least one of said particular address amounts.

3. The apparatus of claim 1 wherein said means for defining includes a print shaft for rotating to define said sequence of print operations, a particular angular position of the print shaft defining a corresponding print operation.

4. The apparatus of claim 3 wherein said print shaft includes means for defining said intermediate operation at an angular position of 85° with respect to a 0° position for said initiation operation.

5. The apparatus of claim 1 including means for applying auxiliary power to at least said memory means when said printer power loss occurs and memory fail means for registering a memory fail condition when auxiliary power is lost, the control means being responsive to a memory fail condition to return the printing element to a margin position when printer power is returned following a loss of printer power and auxiliary power.

6. The apparatus of claim 1 wherein said memory means includes:

CURNT means for storing at the time of the initiation operation of a particular cycle a first address amount representative of the number of print line positions between the character associated with the particular cycle and the next successive character, NEXT means for storing at a time between the initiation operation and intermediate operation of said particular cycle a second address amount representative of the number of print line positions between said next successive character and the character following the next successive character, and D means for storing a third address amount that is incremented by said second address amount when said second address amount is stored in said NEXT means, the incremented third address amount corresponding to the number of print line positions between a margin reference position and said character following the next successive character.

7. The apparatus of claim 6 wherein said control means includes means for computing a return destination amount RET, defining the return position for the printing element when printer power is lost and then restored, the computation being of the form:

$$RET = D - CURNT - NEXT.$$

8. In a typewriter of the kind wherein character representative codes from a storage or keyboard apparatus are applied by printing apparatus to print the represented characters, the printing apparatus being energized by a source of electrical energy and having a print shaft that rotates to define a print cycle for each character, the cycle having a sequence of printing operations, the improvement of power interrupt recovery apparatus comprising:

status memory means for recording a flag signal indicative of the point in said print cycle at which the momentum of said printing apparatus will result in a satisfactory printing of a character;

position memory means for storing character identity data and character print position data corresponding to the operational state of said print shaft with respect to the character being printed and the projected print positions of at least two successive characters; and control means responsive to a power loss and subsequent power return condition for beginning printing in accordance with the state of said flag signal and the data stored in said memory means, at the character position following the last character that was satisfactory printed before the power loss occurred, the control means selectively reinitiating the printing of a character inadequately printed immediately prior to the power loss.

* * * * *

UNITED STATES PATENT AND TRADEMARK OFFICE
CERTIFICATE OF CORRECTION

PATENT NO. : 4,279,523
DATED : July 21, 1981
INVENTOR(S) : Terry W. Ringle

It is certified that error appears in the above—identified patent and that said Letters Patent is hereby corrected as shown below:

Col. 10, line 48, delete "desitination" and insert --destination--.

Col 11, line 61, after "print" insert --point--.

Col. 14, line 21, delete "satisfactory" and insert --satisfactorily--.

*Signed and Sealed this*

*Twentieth* Day of *October 1981*

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,279,523
DATED : July 21, 1981
INVENTOR(S) : Terry W. Ringle

It is certified that error appears in the above—identified patent and that said Letters Patent is hereby corrected as shown below:

Column 9, line 38, change "complate" to -- complete --.

Signed and Sealed this

Twenty-fourth Day of November 1981

[SEAL]

Attest:

GERALD J. MOSSINGHOFF

Attesting Officer

Commissioner of Patents and Trademarks